United States Patent
Neuhaus et al.

(10) Patent No.: US 8,266,778 B2
(45) Date of Patent: Sep. 18, 2012

(54) ASSEMBLY APPARATUS FOR THE ASSEMBLY OF A FUSELAGE SECTION

(75) Inventors: Frank Neuhaus, Jork (DE); Rainer Schildt, Oderquart (DE); Volker Meiz, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 1066 days.

(21) Appl. No.: 12/080,926

(22) Filed: Apr. 7, 2008

(65) Prior Publication Data
US 2008/0256776 A1    Oct. 23, 2008

Related U.S. Application Data

(60) Provisional application No. 60/925,101, filed on Apr. 18, 2007.

(51) Int. Cl.
*B21D 39/03*    (2006.01)
*B23P 11/00*    (2006.01)
(52) U.S. Cl. ............... 29/429; 29/428; 356/622
(58) Field of Classification Search .......... 9/34 B, 9/33 K, 428–431; 227/51; 356/3, 622; 29/34 B, 29/33 K, 428–431
See application file for complete search history.

(56) References Cited

U.S. PATENT DOCUMENTS

| 5,896,637 | A  | * | 4/1999 | Sarh ........................... 29/34 B |
| 7,783,376 | B2 | * | 8/2010 | Marsh et al. ................. 700/195 |
| 2006/0118235 | A1 | * | 6/2006 | Lum et al. .................... 156/285 |

OTHER PUBLICATIONS

Fuselage photo—http://www.voughtaircraft.com/gallery/locations/locations.htm at least as early as Apr. 2007.

* cited by examiner

*Primary Examiner* — Richard Chang
(74) *Attorney, Agent, or Firm* — Jenkins, Wilson, Taylor & Hunt, P.A.

(57) ABSTRACT

The present invention provides an assembly apparatus for supporting a fuselage section of an aircraft or spacecraft in an adjustable assembly position, with at least one stiffening bow for detachably stiffening the fuselage section and a rotational support, which rotatably supports the at least one stiffening bow. Also provided is a method for the assembly of a fuselage section of an aircraft or spacecraft in which an assembly position of the fuselage section is prescribed. In further steps, the fuselage section is reinforced with a stiffening bow and the stiffening bow is rotatably supported. The stiffening bow is then turned in such a way that the fuselage section rotates into the assembly position.

13 Claims, 3 Drawing Sheets

ASSEMBLY APPARATUS FOR THE ASSEMBLY OF A FUSELAGE SECTION

CROSS-REFERENCE TO RELATED APPLICATIONS

This application claims the benefit of U.S. Provisional Application No. 60/925,101, filed Apr. 18, 2007, the entire disclosure of which is herein incorporated by reference.

FIELD OF THE INVENTION

The present invention relates to an assembly apparatus for supporting a fuselage section of an aircraft or spacecraft in an adjustable assembly position, and to a method for the assembly of a fuselage section of an aircraft or spacecraft.

BACKGROUND OF THE INVENTION

Although it can be applied to any objects to be assembled, the present invention and the problems on which it is based are explained in more detail with reference to an approximately cylindrical section of a fuselage of an airplane.

Usually, fuselage shells for airplanes are produced in what is known as a lightweight construction from an outer skin which is reinforced on the inner side by a two-dimensional structure of stringers extending in the longitudinal direction of the airplane and frames extending transversely to the longitudinal direction of the airplane. The production process thereby involves the separate assembly of individual fuselage sections, which have for example approximately the form of a lateral surface of a cylinder or a truncated cone, to be subsequently joined together to form a complete airplane fuselage.

The company Vought Aircraft shows on its website http://www.voughtaircraft.com/gallery/locations/locations.htm an apparatus in which the outer skin of an airplane fuselage section is suspended between two rotatably mounted rings before nondestructive inspection of the outer skin.

In the assembly of such fuselage sections, conventionally the outer skin of the section concerned is placed in a rigid jig formed in a way corresponding to the form of a section and is equipped by fitters with frames, clips for fastening the frames, holders for cabling running in the airplane, reinforcing trusses in the floor and ceiling areas, window frames and other assembly parts. The rigid form of the jig prevents the outer skin, which at first is not yet equipped with frames, from being deformed under the effect of gravitational force, keeps the outer skin in the desired final form of the section during the assembly work and in this way makes it possible for the frames to be precisely fitted.

In the case of conventional jigs, working platforms and frameworks of various heights on which the fitters move about are used inside and around the section to be assembled. Apart from the expenditure on such platforms, there is the problem that the fitters have to carry out much of their work in an ergonomically unfavorable position. For example, in the assembly of a truss in the floor region of the section, a fitter has to carry out work below his own feet, and in the ceiling region he has to carry out work above his own head. Furthermore, the frameworks and working platforms take up space, which restricts the amount of work that can be carried out simultaneously inside the section and leads to an increased space requirement of the overall jig outside the section.

While in the case of a traditional aluminum construction, the outer skin of the section can be put together from a number of portions which have already been provided at least partially with frame portions or certain assembly parts before installation, when the outer skin is produced from carbon fiber reinforced plastic the outer skin of the section is produced in one piece, by laminating carbon fibers wound around the entire circumference of the section. For this reason, the extent of work to be carried out by fitters on the jig increases, and consequently the significance of the problems described increases.

SUMMARY OF THE INVENTION

It is therefore an object of the present invention to provide an assembly apparatus for supporting a fuselage section that allows assembly work, in particular the assembly of frames, to be carried out unhindered in an ergonomically favorable position.

This object is achieved according to the invention by an assembly apparatus for supporting a fuselage section of an aircraft or spacecraft in an adjustable assembly position.

An idea on which the present invention is based is to stiffen the fuselage section that is to be assembled with a detachable stiffening bow and to support the stiffening bow rotatably on a suitable support. The stiffening of the fuselage section by means of the bow lends the fuselage section adequate stability, so that it can be turned without being deformed or damaged under the effect of gravitational force, in particular even before frames reinforcing the outer skin are assembled. The rotational support of the stiffening bows has the effect of avoiding contact or one-sided loading of the outer skin supported by the reinforcing bow, so that it is made possible for the fuselage section to be turned.

The assembly apparatus according to the invention therefore allows the fuselage section to be turned into different, adjustable assembly positions of the fuselage section, with, for example, different portions of the fuselage section on which a fitter has to carry out work respectively coming to lie at a working position of the fitter that can be prescribed on the basis of ergonomic aspects. As a result, it is possible for the fitter to carry out this work in an ergonomically favorable position, for example at chest height whilst standing. Since the assembly apparatus also allows portions of the fuselage section on which work is to be performed to be moved to the fitter, the expenditure and space requirement for working platforms and frameworks are reduced. Furthermore, the space available is increased, in particular in the interior region of the section, so that more fitters can carry out work simultaneously and unhindered.

According to an embodiment of the invention, the at least one stiffening bow has a fastening side that is formed in a way substantially corresponding to a peripheral cross-sectional contour of the fuselage section and is intended for detachable fastening along at least a sub-portion of the cross-sectional contour of the fuselage section. In the case of such an arrangement, particularly effective stiffening is achieved, in particular before assembly of peripheral frames in the fuselage section.

According to a further embodiment, the fastening side has a multiplicity of pressing elements for pressing against the fuselage section along the cross-sectional contour. This is particularly advantageous because the fastening of the stiffening bow is performed in a particularly undamaging way by pressing the pressing element against the fuselage section. Since the cross-sectional contour extends around the fuselage section, pressing elements that are opposite one another exert pressing forces that are respectively directed against one another, so that the fuselage section is held by them.

According to an embodiment, a respective pressing force or/and height of the pressing elements can be adjusted. This can be achieved for example by threaded screws for the height adjustment. In this way, the pressing forces can be accurately adjusted, so that distortion of the fuselage section is avoided.

According to an embodiment, the rotational support comprises at least one roller for supporting the stiffening bow. The stiffening bow has a rolling surface, which rolls on the at least one roller. This makes a particularly simple and lightweight construction possible, since for example an axis of rotation in a fixed mounting is unnecessary for the turning of the fuselage section. Moreover, the interior space is kept free to a great extent if the reinforcing bow is arranged on the inner side of the fuselage section and completely free if it is arranged on the outer side of the fuselage section.

According to an embodiment, the rolling surface is curved substantially in the form of a portion of the lateral surface of a cylinder or cone. This provides a geometrically fixed axis of rotation about which the fuselage section turns during rolling. If the centre of gravity of the fuselage section lies in the vicinity of the axis of rotation, the fuselage section can be turned with little expenditure of force. Since the volume and position of the space enclosed by the lateral surface of the cylinder or cone does not change during the turning, it is possible for example for working platforms to be positioned in a fixed manner at the outer limitation of the space.

According to an embodiment, a rotary drive which drives the at least one roller is also provided. This allows the fuselage section to be turned quickly and precisely into the desired assembly position without the use of physical force. The rolling surface and/or the at least one roller optionally have a serration, whereby particularly reliable and precise rotary drive is made possible. Optionally provided are an angle-of-rotation determining device, which continuously determines an angle of rotation of the fuselage section, and a control device, which activates the rotary drive in such a way that the determined angle of rotation coincides with an assembly-position angle of rotation corresponding to the assembly position. By determining the angle of rotation directly on the fuselage section, for example by a laser tracking device and mirrors attached to the fuselage section, it is made possible to adjust the desired assembly position particularly precisely.

According to an embodiment, at least one working platform is provided for arrangement in and/or outside the fuselage segment. In this way, work can be carried out in an ergonomically favorable position both inside and outside the fuselage section, in particular whenever the height of the working platform is approximately 1-2 m lower than the height of an axis of rotation of the fuselage section.

According to an embodiment of the method according to the invention, a first frame element is attached in the fuselage section after the fuselage section has been turned into a first assembly position. Optionally, a second assembly position of the fuselage section is also prescribed and the stiffening element is turned in such a way that the fuselage section rotates into the second assembled position, in order subsequently to attach a second frame element in the fuselage section. This method has the particular advantage that, for example, a peripheral frame can be made up from a number of segments and assembled in the fuselage section while the fuselage section is respectively located at an assembly position that is in each case adapted to the elements to be assembled and allows ergonomically favorable and efficient work. The stiffening bow thereby prevents deformation of the fuselage section, so that the segments can be precisely assembled independently of the adjusted assembly position of the fuselage section.

Optionally provided is a step of detaching the stiffening bow from the fuselage section, whereby the stiffening function of the stiffening bow is taken over by the attached frame elements, so that subsequent work can be carried out without any hindrance being caused even by the stiffening bows.

BRIEF DESCRIPTION OF THE DRAWINGS

The invention is explained in more detail below on the basis of exemplary embodiments with reference to the accompanying figures of the drawings, in which.

In the figures, the same reference numerals designate components that are the same or functionally the same, unless otherwise indicated.

DETAILED DESCRIPTION OF THE INVENTION

Figure 1:
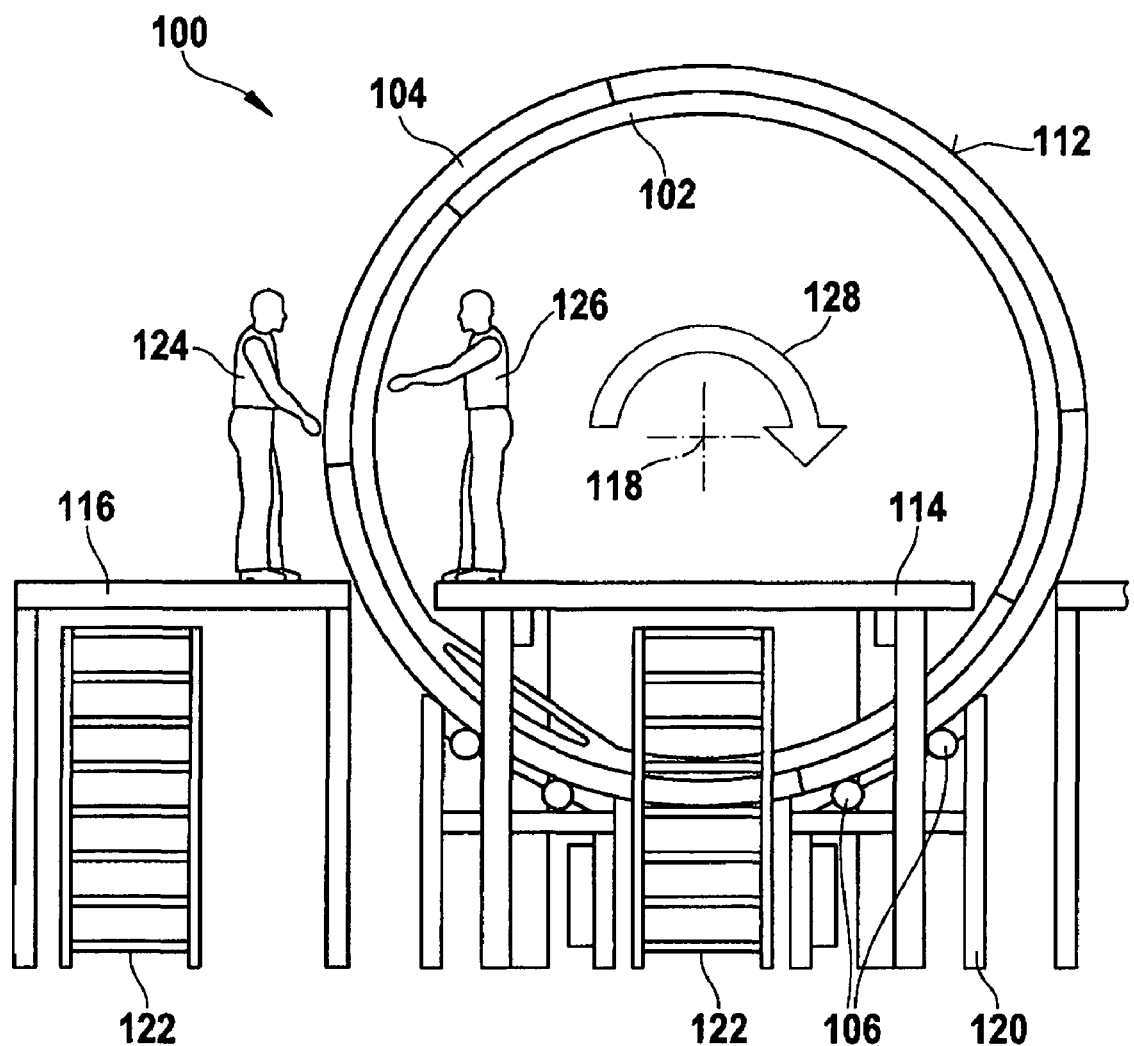
FIG. 1 shows a cross-sectional view of an assembly apparatus according to one embodiment of the present invention.

FIG. 1 shows in a cross-sectional view an assembly apparatus 100 for supporting a fuselage section 102 of an airplane that is under construction. The approximately cylindrical fuselage section 102 represented has an outer cross section deviating slightly from the form of an ideal circle. The fuselage section 102 is surrounded on its outer side by one or more approximately annular bows 104, which have an inner contour following the outer contour of the fuselage section 102 and are fastened on the outer side of the fuselage section 102 to stiffen the outer skin for the time of the assembly work. In the view shown, only one of the stiffening bows 104 can be seen. It comprises four angular segments, which are produced for example from aluminum or steel, and, for fastening on the fuselage section 102, have been arranged around the latter and screwed to one another.

On its outer side, the stiffening bow 104 has a rolling surface 112, which together with corresponding further stiffening bows, which in the representation are arranged behind the stiffening bow 104 that is shown, define the lateral surface of a cylinder with the axis 118 extending perpendicularly in relation to the plane of the drawing. The rolling surface 112 lies on a total of four rollers 106, which are formed for example as aluminum rollers with rubber armoring and are rotatably mounted in a roller stand 120.

Respectively arranged inside and outside the fuselage section 102 are working platforms 114, 116, which can be climbed onto by fitters 124, 126 by means of corresponding steps 122, in order to carry out work on the inside or outside of the fuselage section 102.

The fitters 124, 126 shown standing on the outside and inside carry out assembly work on portions of the fuselage section that are respectively located in front of them at approximately chest height during the operation of the assembly apparatus. Consequently, the assembly work can be carried out in an ergonomically favorable way in a standing position. To carry out assembly work on different portions of the fuselage section 102, for example, the rollers 106 are driven by a rotary drive that is not shown, so that the rolling surface 112 rolls on the rollers 106, whereby a turning 128 of the fuselage section 102 about the axis 118 is obtained. The turning 128 is stopped as soon as the desired portions on which assembly work is to be performed come to lie in the vicinity of the standing fitters. The fuselage section 102 is expediently arrested in this assembly position.

Figure 2:
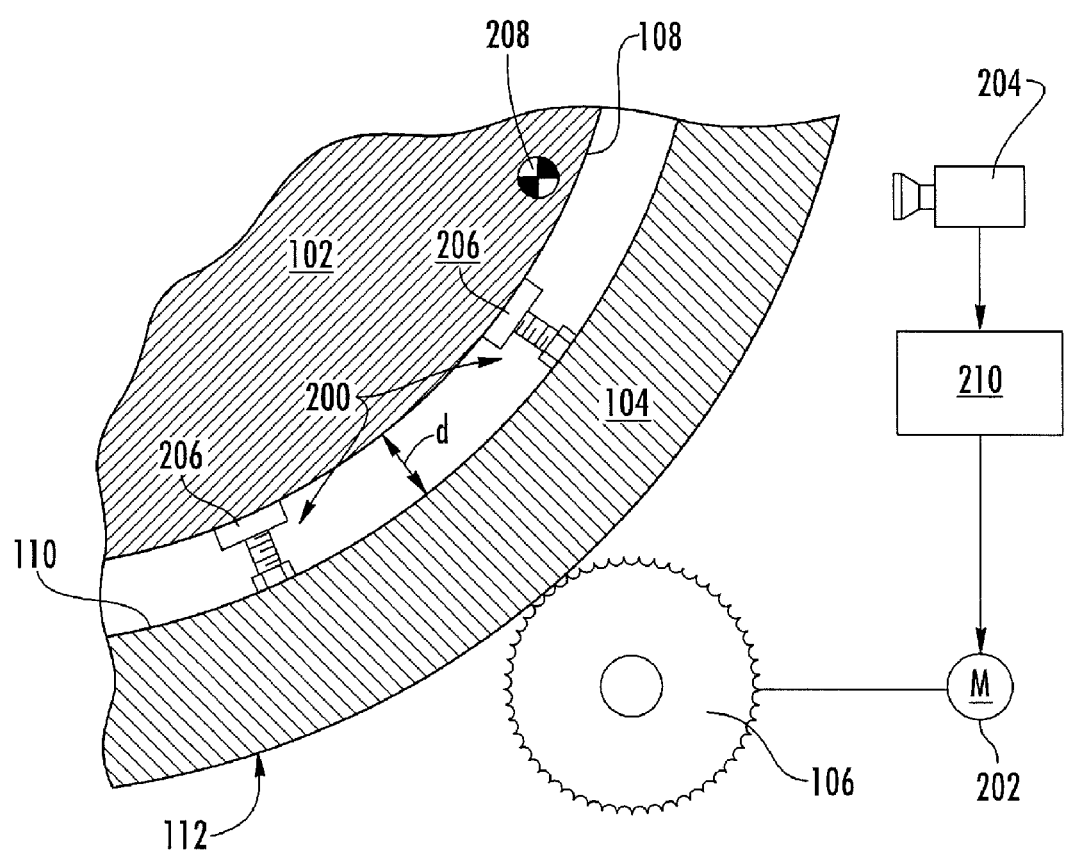
FIG. 2 shows a schematic cross-sectional view in the form of a detail of an assembly apparatus according to one embodiment of the present invention.

FIG. 2 shows in a schematic cross-sectional view a detail of an assembly apparatus such as that shown in FIG. 1. The assembly apparatus has a multiplicity of pressing elements 200, arranged uniformly over the inner circumference 110 as the fastening side of the stiffening bow 104. The pressing elements 200 apply a radial compressive force to the outer circumference 108 along a cross-sectional contour of the fuselage section 102 and are adjustable both in the radial direction and in the circumferential direction, so that fuselage sections 102 of different outside diameters and outer contours 108 can be accommodated in the assembly apparatus. The pressing elements 200 act in each case by means of a plastic disc 206 on the outer circumference 108 of the fuselage section 102, so that the latter is clamped in between the pressing elements 200. The plastic discs 206 serve for protecting the fuselage section. Consequently, an annular space of a preferably constant width d is formed between the inner circumference 110 of the stiffening bow 104 and the outer circumference 108 of the fuselage section 102. The width d of the annular space is preferably approximately 20 cm.

An electric motor 202 is connected as the rotary drive 202 to the roller 106. It is activated by a control device 210. An angle-of-rotation determining device 204, which for example comprises a camera observing the marking 208 applied to the fuselage section 102 or a laser tracking device, determines during operation a real-time angle of rotation of the fuselage section 102 and presents it to the control device 210, enabling the latter to switch the electric motor off when a preselected assembly position of the fuselage section is reached.

Figure 3:
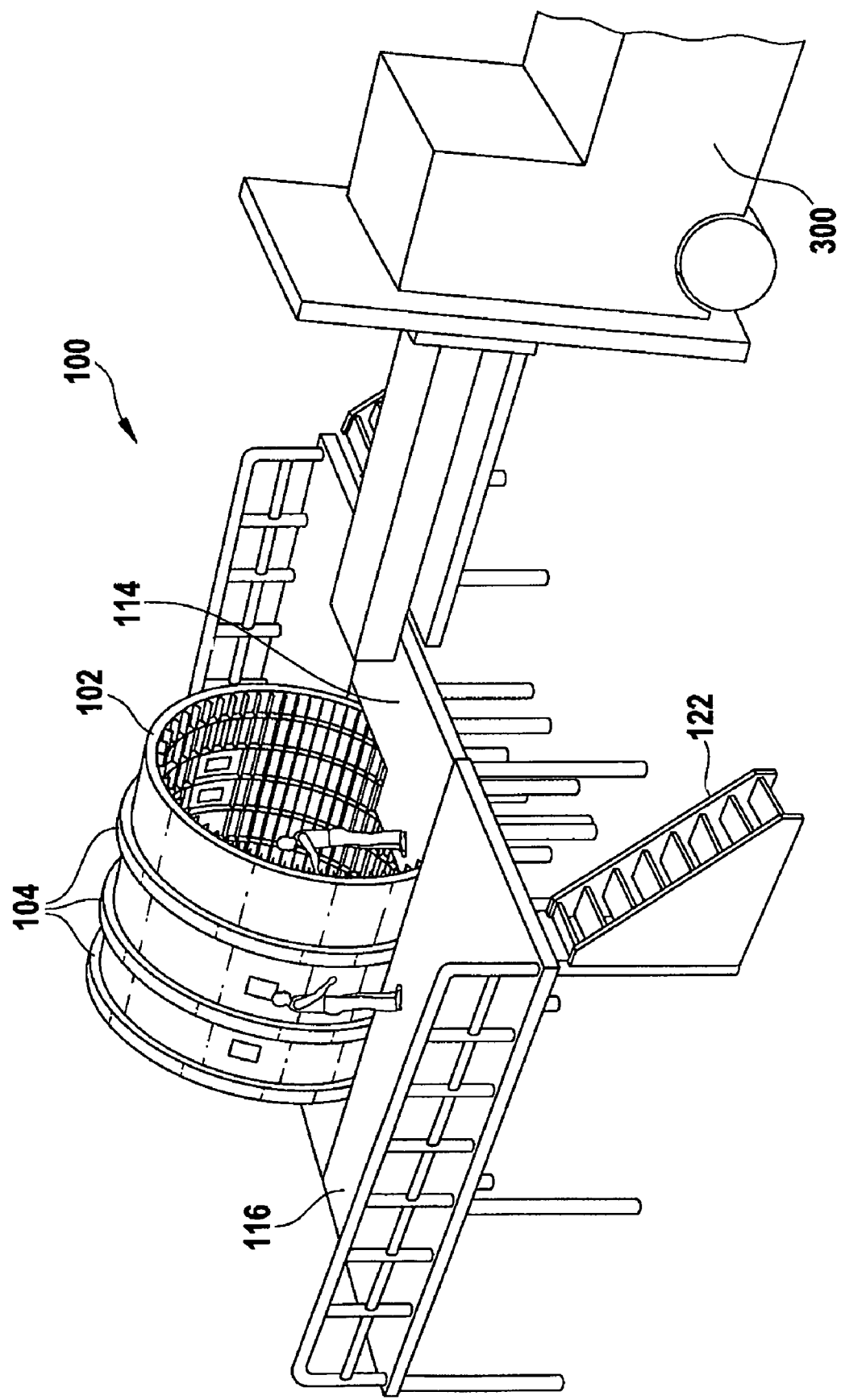
FIG. 3 shows a perspective view of an assembly apparatus according to one embodiment of the present invention.

FIG. 3 shows in a perspective view an assembly apparatus 100 according to one embodiment of the present invention. An approximately cylindrical fuselage section 102 is stiffened by three annular stiffening bows 104, which lie in a rollable manner on rollers that are not shown but are arranged underneath the plane of an outer working platform 116 that can be reached by means of steps 122. An inner working platform 114 may be arranged for example by means of a forklift truck 300 inside the fuselage section 102, on preferably the same plane as the outer working platform 116, once the fuselage section has been placed into the assembly apparatus 100.

Although the present invention has been described here on the basis of preferred exemplary embodiments, it is not restricted to these but can be modified in various ways.

For example, annular stiffening elements rolling on rollers may also be arranged on the inner side of a fuselage section, the rolling surface of the stiffening elements facing inwards and the fastening side facing outwards. With suitable fastening to the stiffening elements, it is also possible for not only approximately rotationally symmetrically formed objects to be rotatably positioned but also objects of any form.

What is claimed is:

1. An assembly apparatus for supporting a fuselage section of an aircraft or spacecraft in an adjustable assembly position, comprising:
   at least one stiffening bow for detachably stiffening the fuselage section; and
   a rotational support capable of rotatably supporting said stiffening bow;
   wherein said stiffening bow comprises a fastening side along at least a portion of a cross-sectional contour of the fuselage section;
   wherein the fastening side corresponds to a peripheral cross-sectional contour of the fuselage section and comprises a plurality of pressing elements capable of pressing against the cross-sectional contour of the fuselage section by a plurality of plastic discs; and
   wherein said pressing elements are adjustable in at least one of a radial or a circumferential direction.

2. The assembly apparatus according to claim 1, wherein at least one of a pressing force and a height of the plurality of pressing elements is adjustable.

3. The assembly apparatus according to claim 1, wherein the rotational support comprises at least one of a plurality of rollers for supporting said stiffening bow, and wherein said stiffening bow further comprises a rolling surface for rolling on the at least one of the plurality of rollers.

4. The assembly apparatus according to claim 3, wherein the rolling surface is curved substantially in the form of a portion of a lateral surface of at least one of a cylinder and cone.

5. The assembly apparatus according to claim 3, further comprising a rotary drive for driving the at least one of the plurality of rollers.

6. The assembly apparatus according to claim 3, wherein at least one of the rolling surface and the at least one roller surface comprise a serration.

7. The assembly apparatus according to claim 5, further comprising:
   an angle-of-rotation determining device capable of continuously determining an angle of rotation of the fuselage section, and
   a control device for activating the rotary drive in such a way that the angle of rotation of the fuselage section coincides with an assembly-position angle of rotation corresponding to the assembly position.

8. The assembly apparatus according to claim 1, further comprising at least one working platform capable of being arranged at least one of inside and outside of the fuselage between 1 and 2 m lower than the height of an axis of rotation of the fuselage section.

9. A method for the assembly of a fuselage section of an aircraft or spacecraft, the method comprising:
   prescribing a first assembly position of the fuselage section;
   stiffening the fuselage section using a detachable stiffening bow;
   rotatably supporting the stiffening bow; and
   turning the stiffening bow in such a way that the fuselage section rotates into the first assembly position;
   wherein said stiffening bow comprises a fastening side along at least a portion of a cross-sectional contour of the fuselage section;
   wherein the fastening side corresponds to a peripheral cross-sectional contour of the fuselage section, and comprises a plurality of pressing elements capable of pressing against the cross-sectional contour of the fuselage section by means of a plurality of plastic discs; and
   wherein said pressing elements are adjustable in at least one of a radial, and in a circumferential direction.

10. The method according to claim 9, wherein the stiffening bow is supported on rollers and the turning of the stiffening bow is performed by rolling of a rolling surface of the stiffening bow on the rollers.

11. The method according to claim 9, further comprising attaching a first frame element in the fuselage section after the turning into the first assembly position.

12. The method according to claim 9, further comprising:
   prescribing a second assembly position of the fuselage section;
   turning the stiffening bow in such a way that the fuselage section rotates into the second assembly position; and
   attaching a second frame element in the fuselage section after the turning into the second assembly position.

13. The method according to claim 9, further comprising detaching the stiffening bow from the fuselage section.

* * * * *